US007409209B2

(12) United States Patent  
Adan et al.

(10) Patent No.: US 7,409,209 B2
(45) Date of Patent: Aug. 5, 2008

(54) TELEPHONY REMOTE CONTROL (75) Inventors: Manolito E. Adan, Woodinville, WA (US); Michael W. Van Flandern, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 957 days.

(21) Appl. No.: 10/424,369

(22) Filed: Apr. 24, 2003

(65) Prior Publication Data

US 2004/0214562 A1  Oct. 28, 2004

(51) Int. Cl.
H04M 3/00 (2006.01)
(52) U.S. Cl. ...................................... 455/420; 455/419
(58) Field of Classification Search ................ 455/420, 455/557, 39, 419; 379/352; 709/206; 463/41; 725/25
See application file for complete search history.

(56) References Cited

U.S. PATENT DOCUMENTS 5,236,199 A * 8/1993 Thompson, Jr. .............. 463/41
5,457,742 A * 10/1995 Vallillee et al. .............. 379/352
5,943,625 A * 8/1999 Yeom et al. .................. 455/557
6,237,027 B1 * 5/2001 Namekawa .................. 709/206
2001/0018329 A1 * 8/2001 Tada et al. ..................... 455/39
2003/0177489 A1 * 9/2003 Watanabe et al. ............ 725/25

* cited by examiner

Primary Examiner—Thjuan K Addy (57) ABSTRACT

A user activates switches comprising a keypad of a telephone to produce a dual-tone, multi-frequency (DTMF) signal that controls the characteristics of a wireless control signal that is transmitted to control another device. The DTMF tones produced by the keypad are scanned by a microcontroller or by the processor of a personal computer that is coupled to the telephone. In response to detecting predefined DTMF tones from the keypad, an infrared or radio frequency wireless control signal is transmitted to the other device to affect a corresponding control function. For example, when a telephone call is received, the "*" key followed by another predefined key on the keypad can be activated to produce a wireless control signal that causes an audio/video component to be muted. The remote control functionality of the telephone keypad can also be used for other purposes, such as controlling a cursor on a display or making a selection.

6 Claims, 5 Drawing Sheets

TELEPHONY REMOTE CONTROL

FIELD OF THE INVENTION

The present invention generally pertains to a remote control for controlling electronic devices using a wireless transmitted signal, and more specifically, pertains to a remote control system that responds to a user activating switches on a dual-tone, multi-frequency (DTMF) keypad of a telephone in transmitting wireless control signals to an electronic device, for controlling one or more functions of the device.

BACKGROUND OF THE INVENTION

Almost every audio/video (A/V) entertainment device is sold with a wireless remote control to enable a user to remotely control the device. A home entertainment center typically includes an A/V receiver, a cable box or satellite receiver, a television or video monitor, a video recorder, and a digital video disc and/or compact disc player. Each of these devices is usually sold with its own remote control and one or more of the remote controls may be capable of serving as a "universal" remote control that can selectively control several of the devices in the entertainment center. Invariably, while enjoying a movie or otherwise experiencing the benefits of the home entertainment center, a telephone will ring, requiring the user to find the appropriate remote control (or universal remote control) to pause a video or tape playback, or either turn down or mute the volume of the receiver or other A/V device that is currently playing. Since remote controls tend to be used in different locations in a room, the user will often have to delay answering or talking on the telephone, in order to locate the remote control that is needed to carry out the desired control function, so that the user can talk to the party calling on the telephone.

Clearly, it would be preferable to avoid the need to find an appropriate remote control to pause, turn down the volume, or mute A/V equipment when answering a telephone call. One approach to solving this problem would be to simply incorporate a conventional universal remote control in each desktop telephone that is used where the remote control of nearby equipment may be required. However, for many home applications, the added cost, required additional size of the handset/telephone base, and the increased complexity required to include a conventional universal remote control in the telephone would tend to make such a solution impractical. Especially for home use, it would be more desirable to use a telephone handset that is generally conventional in appearance and in the control keypad provided, but which in cooperation with other components coupled to the telephone system, is able to provide the desired remote control functions.

Even greater remote control functionality might be provided by integrating a computing device, such as a personal computer (PC), with a user's telephone system, and using the computing device to implement logic that expands the remote control capability. For example, it would be desirable to enable a user to employ a conventional telephone, at any location in the world, to remotely control a PC and/or other electronic devices within a user's home, in response to entry by the user of a predefined control code on the conventional telephone DTMF keypad of the telephone from which the user is calling a telephone that is coupled to the PC or other computing device. The user should be able to simply activate the conventional keys or switches on the keypad of the telephone, producing DTMF tones that are recognized by the PC or computing device to initiate the desired remote control functionality, using a wireless signal that is transmitted to the controlled device.

Another desirable remote control capability would enable a telephone keypad to be employed as a pointing device to control a cursor, for example on a display or a monitor of a PC. Since the key pad on a conventional telephone is generally analogous to a numeric keypad on a PC, it would be desirable to employ the telephone keypad in much the same way as the numeric keypad is used as "mousekeys" to control a cursor on a PC display, and to make selections. In this manner, a cordless telephone, or perhaps a cell telephone could be used as a wireless pointing device to move a cursor and/or select options on a PC, or a television display, or on a display screen during a presentation.

SUMMARY OF THE INVENTION

It is contemplated that the present invention can be implemented is a variety of different ways, depending upon whether the invention will be used with a conventional telephone so that no modification is required of the telephone, or whether the invention will be used in connection with a computing device, such as PC. If a conventional telephone is modified to include the present invention, circuitry for implementing the invention can be installed within the housing of a handset of the telephone so that a wireless signal for use in controlling another device is transmitted by the handset to the other device in response to conventional telephone keypad buttons being depressed by the user. Alternatively, a wireless transmitter used for producing the wireless control signal to control another device can be included within a housing of a base or in a base station of the telephone.

To enable a telephone to be used for remotely controlling another device, in one embodiment, specific DTMF tones produced by activating keys on a keypad of the telephone must be detected and in response, a corresponding wireless control signal is transmitted to the device being controlled. The circuitry for monitoring DTMF tones produced by a user activating switches on a keypad, and for transmitting the wireless control signal can optionally be disposed within a handset of the telephone, or within its base, or in an external module that is disposed between the telephone and the telephone system with which the telephone communicates.

In response to a user activating selected switches on the keypad of the handset or on the base of the telephone, the wireless transmitter that is included within the handset or base of the telephone transmits a corresponding wireless control signal having a predefined characteristic to the device that is being controlled. A handset used to produce the DTMF signal may be coupled to the base of the telephone through a wire connection or may be portable and use a radio frequency (RF) signal to communicate with the base. As a further alternative, a handset used to produce the DTMF signal for remotely controlling a device can be a cell telephone that is coupled to another telephone or to another component that produces the wireless control signal.

In addition, other signals associated with the telephone may be used to cause the wireless control signal to be transmitted to control a device. For example, a ringing signal can be detected when a call is placed to the telephone, and in response the wireless control signal can be transmitted. Or, when the telephone is taken off hook (or activated to connect to a telephone line), the off-hook state can be detected to cause the wireless control signal to automatically be transmitted. Each of these configurations for different embodiments of the present invention will be apparent from the detailed description provided below, in connection with the drawing Figures.

A first aspect of the present invention is directed to a method for using a telephone as a wireless remote control for controlling a device. The method includes the step of monitoring a signal associated with the telephone. In response to detecting a predefined state of the signal, a predefined control signal is transmitted to the device to effect a controlled function of the device.

The predefined control signal may be an infrared (IR) signal or an RF signal having a characteristic that is associated with causing the controlled function. In at least one embodiment, the method includes the step of learning the predefined control signal from a different remote control that is associated with the device. To learn the predefined signal, a selected control switch on the different remote control is activated to produce a wireless control signal that will cause the device to effect the controlled function. The wireless control signal produced by the different remote control is received to determine its characteristics, which are stored in a memory for use in producing the predefined control signal in response to the predefined switches activated on the telephone keypad.

In one application of this method, the controlled function corresponds to moving a displayed cursor. In this case, the telephone keypad includes an array of switches, and the signal produced by selectively activating different switches on the telephone keypad causes the control signal to move the displayed cursor in different predefined directions.

The signal produced by the telephone can be conveyed to a different location over either a private branch exchange (PBX) or a public switched telephone network (PSTN). The control signal is then transmitted to the device being controlled, at the different location.

Preferably, the predefined switch contacts include a non-numeric switch on the telephone keypad, which is activated in sequence with one or more other predefined switches. It is desirable to suppress audibility of the DTMF signal so that the DTMF tones are not heard by another party who is coupled in communication with the user activating the switches to produce the DTMF signal.

Another aspect of the present invention is directed to a memory medium on which machine instructions are stored for carrying out steps of the method.

Yet another aspect of the present invention is directed to a system for using a telephone signal to control transmission of a wireless remote control signal for controlling a device. The system includes a telephone having a keypad with a plurality of switches that are selectively activatable, producing a signal indicative of a signal associated with the telephone. A signal monitoring circuit is responsive to the state of the signal and transmits a predefined control signal in response thereto. The predefined control signal has a characteristic that effects a controlled function on a device that receives the signal. Other functional aspects of the system are similar to the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
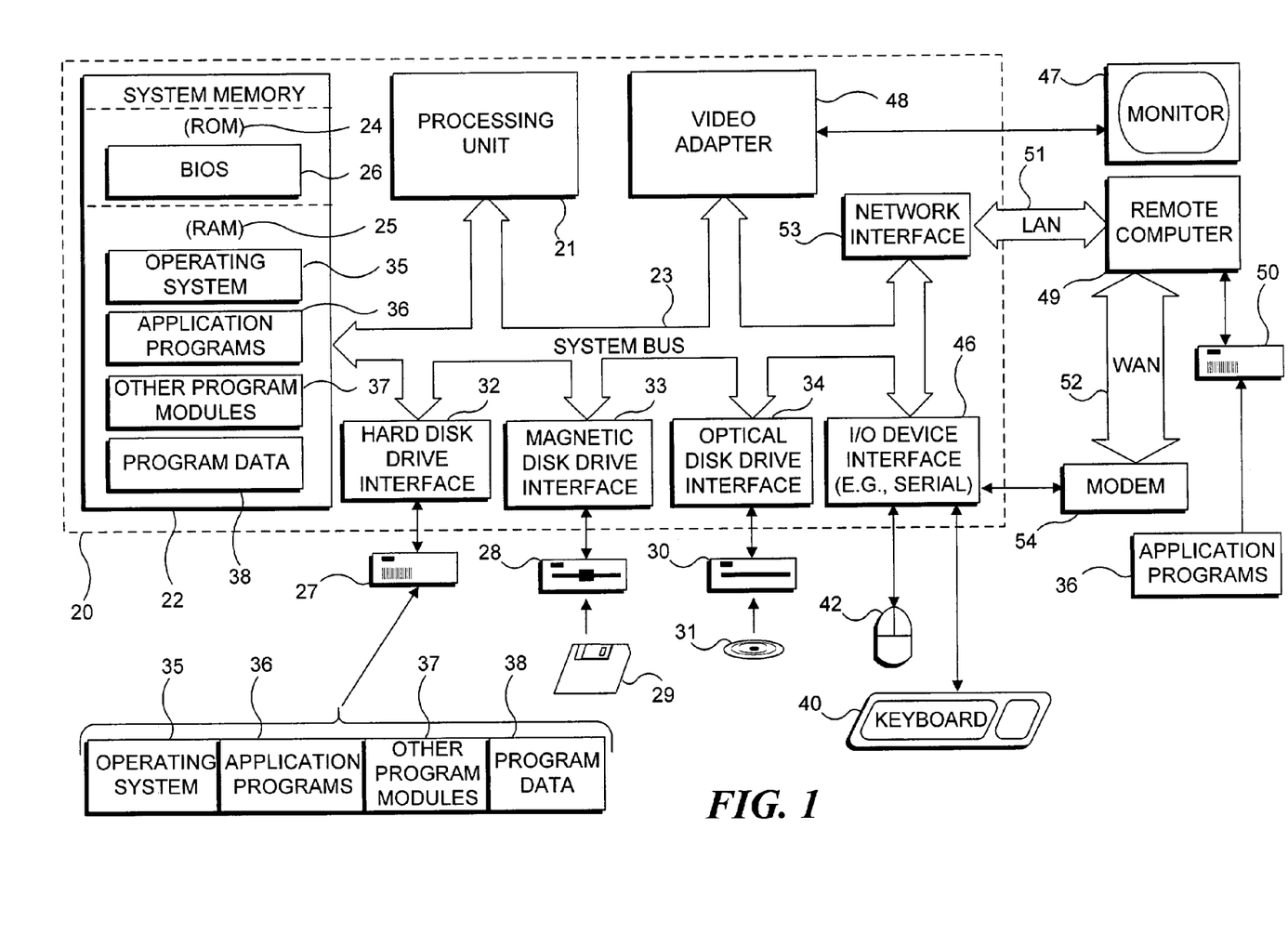
FIG. 1 is a schematic functional block diagram of a generally conventional PC that is suitable for use when implementing the present invention.

FIG. 1 and the following discussion are intended to provide a brief, general description of a suitable computing environment with which the present invention may be employed. Although not required, the present invention may be used with a computing device that executes software described in the general context of computer executable instructions, such as program modules executed on a PC. Generally, program modules include routines, programs, objects, components, data structures, etc. that perform particular tasks or implement particular abstract data types. Moreover, those skilled in the art will appreciate that this invention may be practiced in connection with other computer system configurations, including hand-held devices, pocket personal computing devices, digital cell telephones adapted to connect to a network, and other microprocessor based, or programmable consumer electronic devices, multiprocessor systems, network PCs, minicomputers, mainframe computers, and the like. The invention may also be practiced in connection with distributed computing environments where tasks are performed by remote processing devices that are linked through a communications network. In a distributed computing environment, program modules may be located in both local and remote memory storage devices.

With reference to FIG. 1, an exemplary system for use in connection with the present invention includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk, not shown, a magnetic disk drive 28 for reading from or writing to a removable magnetic disc 29, and an optical disk drive 30 for reading from or writing to a removable optical disc 31, such as a CDROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer readable media provide nonvolatile storage of computer readable machine instructions, data structures, program modules and other data for PC 20. Although the exemplary environment described herein employs a hard disk, removable magnetic disc 29, and removable optical disc 31, it will be appreciated by those skilled in the art that other types of computer readable media, which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disc 29, optical disc 31, ROM 24 or RAM 25, including an operating system 35, one or more application programs 36 (such as a program that employs the present invention), other program modules 37, and program data 38. A user may enter commands and information into PC 20 through input devices such as a keyboard 40 and a pointing device 42. Other input devices (not shown) may include a microphone, joystick, game pad, satellite dish, scanner, or the like. These and other input devices are often connected to processing unit 21 through an input/output (I/O) interface 46 that is coupled to the system bus. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display data from content sources accessible through an application, and/or other information. In addition to the monitor, PCs are often coupled to other peripheral output devices (not shown), such as speakers (through a sound card or other audio interface—not shown), and printers.

PC 20 may operate in a networked environment using logical connections to one or more remote computers, such as a remote computer 49. Remote computer 49 may be another PC, a server (which is typically generally configured much like PC 20), a router, a network PC, a peer device, satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets and the Internet.

When used in a LAN networking environment, PC 20 is connected to LAN 51 through a network interface or adapter 53. When used in a WAN networking environment, PC 20 typically includes a modem 54, or other means for establishing communications over WAN 52, such as the Internet. Modem 54, which may be internal or external, is connected to the system bus 23, or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Preferred Embodiments of the Present Invention

Figure 2:
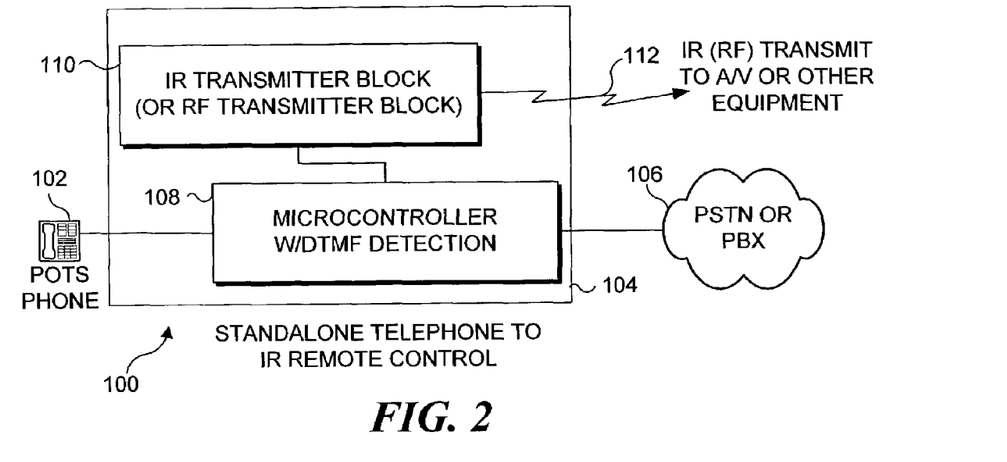
FIG. 2 is a schematic diagram of a first embodiment of the present invention wherein a plain old telephone service (POTS) telephone is used to provide a DTMF signal for determining an infrared signal transmitted to control another device.

As shown in embodiment 100 in FIG. 2, a wireless transmitter module 104 is coupled between a POTS telephone 102 and a PSTN or PBX system 106. Signals from the POTS telephone are conveyed bi-directionally through wireless control module 104 as if the POTS telephone were directly connected to PSTN or PBX system 106. However, wireless transmitter module 104 includes a microcontroller (with DTMF detection) 108 so that DTMF tones that are being conveyed between POTS telephone 102 and PSTN or PBX system 106 are monitored and detected. If the DTMF tones that are detected correspond to a predefined set of such tones, the microcontroller responds by causing an IR transmitter block (or RF transmitter block) 110 to transmit an IR (or RF signal) to A/V or other equipment that is to be controlled. The characteristics of the IR (or RF) signal that is transmitted are selected to implement a specific control function in the device or equipment receiving the IR (RF) signal. This control function might be the muting or the reduction in volume of A/V equipment, for example, which would be an appropriate function to carry out when a telephone call is received by POTS telephone 102 which the called party is using the A/V equipment. It is expected that a user of POTS telephone 102 would simply respond to a ringing signal on the telephone by picking up its handset and activating the "*" switch or key and another predefined switch or key on the keypad of the handset, producing two or more predefined DTMF tones. In response to these two predefined DTMF tones, microcontroller 108 will cause the appropriate IR (or RF) signal to be transmitted by wireless transmitter module 104, so that the media is paused, or the sound of the A/V equipment is muted or its volume reduced, enabling the user to take the telephone call without being disturbed by the sound from the A/V equipment.

It should be noted that microcontroller 108 can also detect DTMF tones that are incoming from PSTN or PBX 106 and are produced by a telephone that is calling POTS telephone 102, after the POTS telephone is off hook. Furthermore, wireless control module 104 can be disposed within the base of POTS telephone 102, or within the handset of the telephone, or can be a standalone module, which is described in greater detail below.

Figure 3:
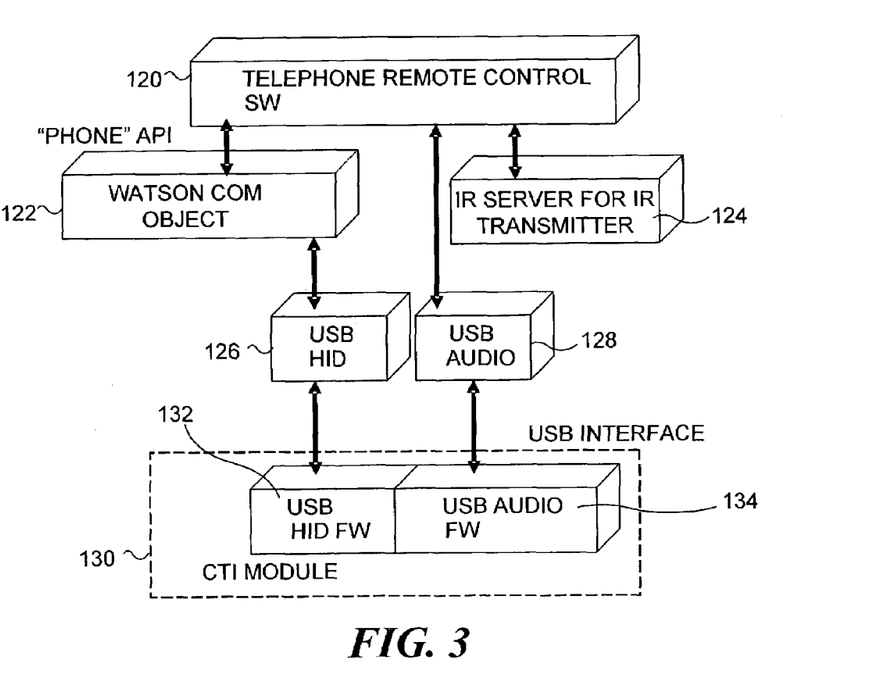
FIG. 3 is a functional block diagram illustrating software components used in connection with one embodiment of the present invention that employs a PC.

As noted above, one embodiment of the present invention is used in conjunction with a PC or other type of computing device. In this embodiment, a computer telephony integration (CTI) module, which includes the remote control functionality of wireless remote control module 100, provides additional functionality because of the greater processing capability of the PC or other computing device. To provide this enhanced functionality, including other functions not directly related to the present invention, a plurality of software modules are employed, as shown in FIG. 3. In this Figure, a block 120 refers to the telephone remote control switches comprising the keypad of the telephone handset or base that are activated by a user to initiate a control function of another device. Block 120 is coupled to a telephone application program interface (API), which in a preferred embodiment, is referred to as a Watson component object model (COM) object 122. This API is executed on the PC to provide an interface between the POTS telephone that is coupled to the PC through the CTI module. Block 120 is also coupled to a USB audio port 128 and to an IR server for providing signals that drive the IR transmitter in a block 124. (Although not indicated in this Figure, an RF server could instead be used to drive an RF transmitter to provide appropriate RF control signals.) USB audio block 128 connects to a USB interface of CTI module 130, providing a communication link with a USB audio firmware block 134. Similarly, Watson COM object 122 is coupled to provide signals conforming to the USB human interface device (HID) specification in a block 126, which in turn is connected to a USB HID firmware block 132 of the USB CTI module. The USB HID firmware provides the user interface display on the PC, enabling a user to select among various options related to the functionality of the CTI module. In connection with the present invention, the user might employ this interface to select a particular controlled function on the device being controlled to be associated with a specific DTMF tone sequence. For example, one DTMF tone sequence might include the tones produced by the * switch or key on a telephone keypad, followed by the DTMF tone produced by activating the "9" switch or key on the keypad. These two switches together, when depressed in sequence during a conversation, could be programmed to mute A/V equipment, or alternatively to turn down its volume, or turn the equipment off, when an IR or RF wireless control signal having the correct characteristics is transmitted to the equipment. Many other controlled functions can of course be associated with different DTMF tone sequences. Preferably, any such sequence will include a non-numeric initial character such as the * or # key to distinguish over keys that are depressed for dialing or for entering other control options when connected to a called party's voicemail system.

Figure 4:
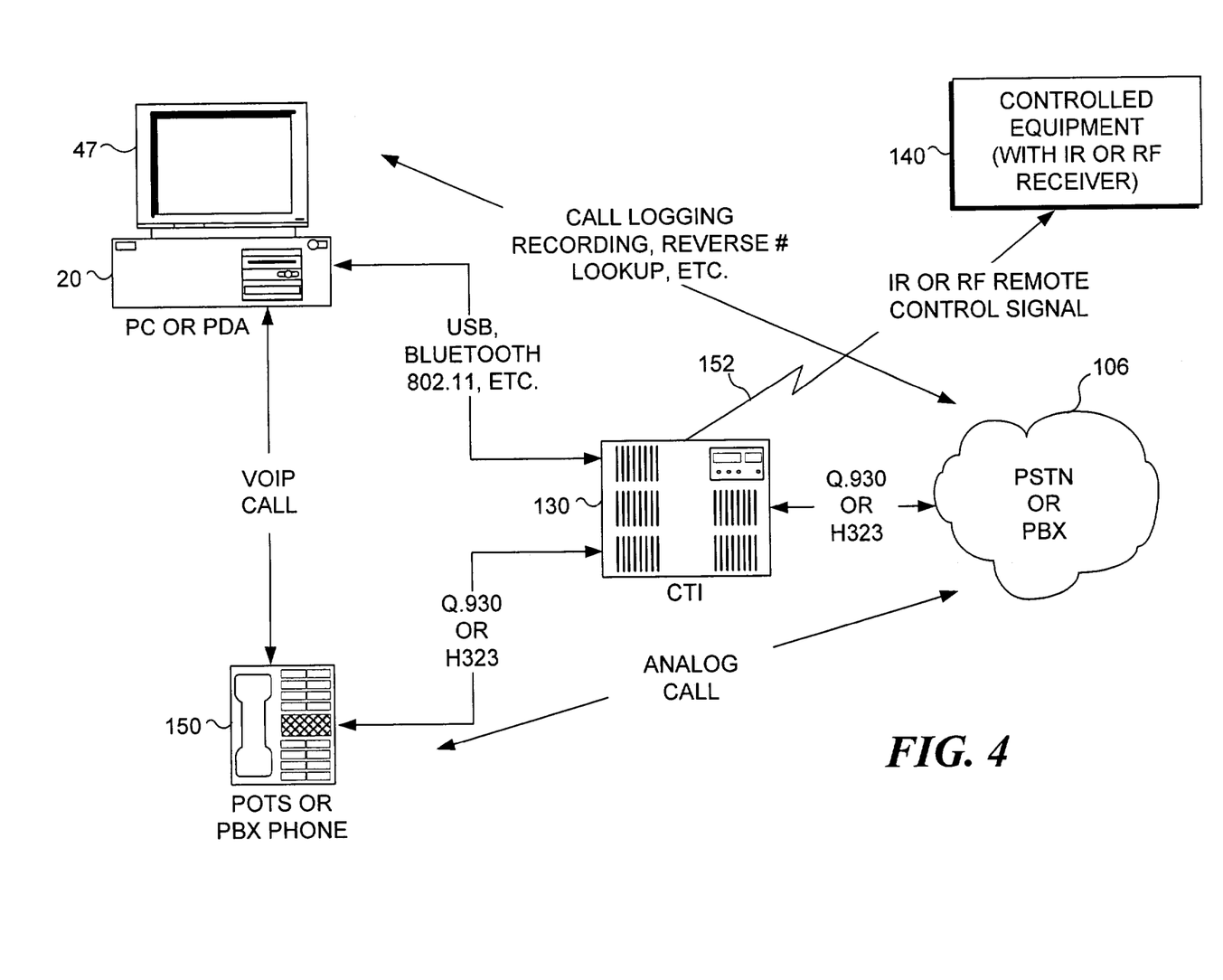
FIG. 4 is functional block diagram illustrating for the embodiment of FIG. 3.

Further details showing an embodiment of the present invention in which remote telephone control is implemented in connection with PC 20 (or other type of computing device, such as a personal digital assistant (PDA)) are illustrated in FIG. 4. As shown in this Figure, a POTS or PBX telephone 150 is connected to CTI module 130. POTS or PBX telephone 150 communicates with CTI module 130 in accord with multimedia teleconferencing standard H.323 or in accord with the Q.930 specification for network interface layer three. A user can connect directly to PSTN or PBX 106 through the CTI module to carry out an analog call, or alternatively, can connect to PC 20 for carrying out a voiceover internet protocol (VoIP) communication with a party at another location using the Internet or other network to which PC 20 and a microphone/phone and PC at the other location are connected. CTI module 130 is preferably coupled to PC 20 through a USB port, but may alternatively be coupled thereto using a wireless communication link, as defined by the "Bluetooth" standard or in accord with the I.E.E.E. 802.11 specification. Other communication functions that are not directly related to the present invention can thus also be implemented on PC 20, including call logging, call recording, reverse number lookup, and so on.

When PC 20 is used with the present invention, for example, in the embodiment including CTI module 103, an improved HID is provided, since monitor 47 of the PC can readily provide a graphic user interface for setting up the remote control functionality implemented by the present invention. A user can activate any of the switches on the keypad of POTS or PBX telephone 150, causing CTI 130 to produce an IR or RF remote control signal 152 that is received by a control device that includes a corresponding IR or RF receiver. Since the characteristics of the IR or RF signal transmitted to the control device are selected to correspond to a control function recognized by the device, the user can thus initiate those control functions by actuating the predefined switches on the keypad to produce the DTMF tones recognized by CTI module 130, causing it to transmit IR or RF remote control signal 152 to the controlled equipment.

Using an IR receiver (not shown) that is often included in PC 20 (particularly in laptop PCs), the characteristics of a plurality of different IR signals can be learned from a remote control originally provided with controlled equipment 140 when it was sold. To learn these IR signal characteristics, it is common for a conventional universal remote control to be placed in a position to receive the IR signal transmitted by the remote control sold with the control device after the universal remote control has been placed in a learning mode. Similarly, PC 20 can learn the characteristics of each of a plurality of different control functions produced when specific switches on the remote control that was sold with controlled equipment 140 are activated. The characteristics of the IR signals associated with specific controlled functions can be stored in the memory of the PC. The user interface displayed on monitor 47 will enable the user then to readily associate any specific controlled function and its associated IR signal characteristics stored in the memory of PC 20 with a corresponding DTMF tone sequence that can be produced by activating specific switches on the keypad of POTS or PBX telephone 150.

Figure 5:
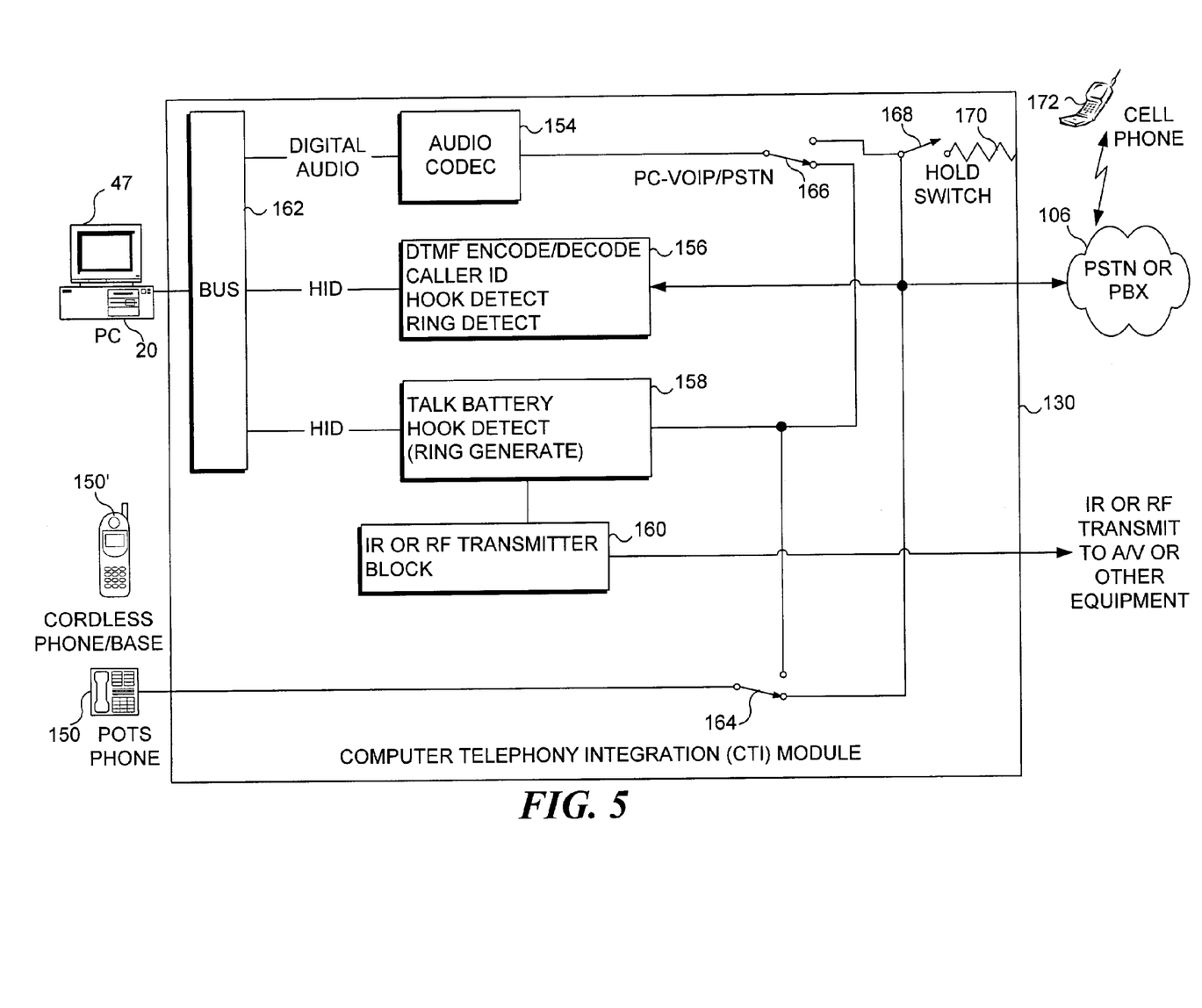
FIG. 5 is a functional block diagram of a computer telephony integration module employed in the embodiments of FIGS. 3 and 4.

FIG. 5 illustrates further details of the functional components of CTI 130. As noted on the left side of FIG. 5, POTS telephone 150 may alternatively comprise a cordless telephone and base 150'. In either case, the cordless telephone and base or the POTS telephone is connected to CTI module 130. Although only single lines are illustrated, it should be understood that both tip and ring lines are included in the connection.

Internally, CTI module 130 includes an audio coder-decoder (CODEC) 154 for encoding and decoding audio data. Digital audio data are conveyed through a bus 162, which is in turn connected to a USB port of PC 20. In addition, a DTMF encode/decode module 156 (which also performs other functions, including caller ID, hook detect, and ring detect) is coupled between DTMF encode/decode module 156 and bus 162. As indicated in this Figure, DTMF encode/decode module 156 produces an HID compliant signal comprising digital data that are conveyed through bus 162 and into the USB port of PC 20.

PC 20 can control various functions carried out by CTI module 130 in response to DTMF codes that are decoded, and in response to either the off-hook detect and ring signal detect implemented by DTMF encode/decode module 156. A module 158 implements talk, battery, hook detect, and ring generate functions and communicates with the USB port of PC 20 using an HID compliant signal via bus 162. Module 158 is connected to an IR or RF transmitter block 160. Under the control of PC 20, IR or RF transmitter block 160 produces a desired IR or RF signal having characteristics corresponding to a controlled function to be implemented by A/V or other equipment to be controlled that receives the IR or RF signal.

A user has the option of configuring CTI module 130 and/or PC 20 to enable and disable transmission of predefined wireless control signals to effect virtually any remotely controlled function of an A/V device or other types of device in response to various detected events. Thus, signaling events such as a ring signal, and an on-hook or off-hook event can be decoded by the CTI module to initiate generation of as programmatically defined control signal. For example, when a caller places a call to POTS or PBX telephone 150, the CTI module will detect the ring signal incoming from the PSTN line and in response, automatically carry out a predefined or programmed function, such as reducing the volume of or muting an A/V device such a stereo receiver or television set, by transmitting a wireless control signal (IR or RF) to the A/V device. The wireless control signal will have a characteristic previously selected by the user to carry out the desired control function. Similarly, a desired control function can be automatically be remotely implemented in response to the CTI module detecting an off-hook signal from POTS or PBX telephone 150. Thus, when a user takes the telephone handset off hook (or switches portable telephone 150' on) to receive or make a call, the CTI module will detect the off-hook event and automatically transmit the wireless control signal previously selected or programmed by the user, to implement a desired control function on the A/V device (or other type of device) by transmitting the appropriate wireless control signal to the device.

Several switches are included within CTI module 130. A switch 164 is selectively set to couple POTS telephone 150 to PSTN or PBX 106, as well as to DTMF encode/decode module 156. Alternatively, switch 164 can be set to connect POTS or PBX telephone 150 to module 158 to enable PC 20 to detect when the telephone is off hook and to generate a ring signal when a VoIP call is received by PC 20. A switch 166 is also coupled to module 158 and to audio CODEC module 154, when positioned to enable VoIP operation. Alternatively, switch 166 is coupled to a position that connects the audio CODEC to PSTN or PBX 106 and to a switch 168. When closed, switch 168 places the POTS telephone on hold by coupling it to a resistor 170.

As noted above, DTMF tones can also be received from another telephone at a remote site through PSTN or PBX 106. For example, a cell telephone 172 can be connected through a cell telephone network to the PSTN system. If cell telephone 172 places a call that is directed by the PSTN system to POTS telephone 150, DTMF encode/decode module 156, which is also coupled to cell telephone 172 through the PSTN system, can decode DTMF tones produced by the cell telephone. Accordingly, PC 20 can cause IR or RF transmitter block 160 to produce appropriate wireless signals for controlling A/V equipment or other types of equipment in response to switches activated by a user on the keypad of cell telephone 172.

Figure 6:
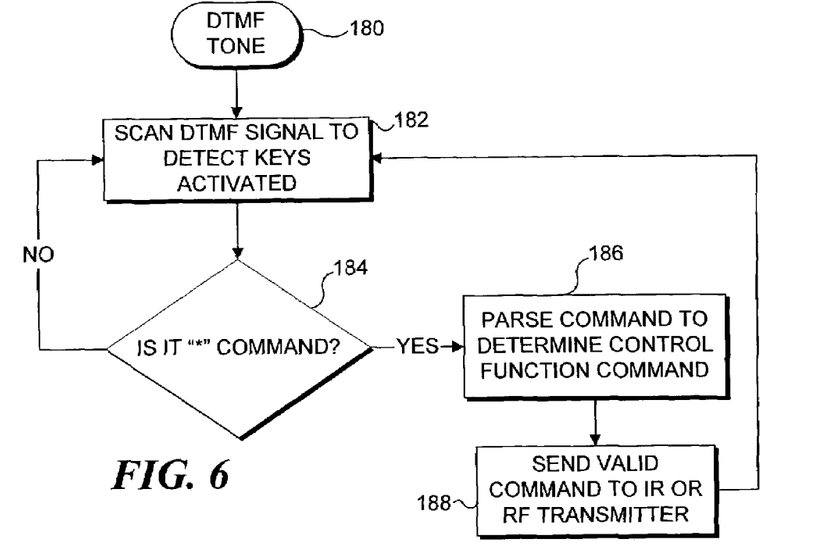
FIG. 6 is a flow chart illustrating the logical steps used in implementing the present invention.

In FIG. 6, the logic implemented in the present invention for responding to DTMF tones is illustrated. A DTMF tone 180 is input to either CTI module 130, as shown in FIG. 5, or to the DTMF detection circuit associated with the microcontroller in block 108, as shown in FIG. 2. Either the processor of PC 20, or the microcontroller scans the DTMF signal to detect the switches or keys that were activated by the user on the keypad of the telephone being used as a remote control in a step 182. Next, a decision step 184 determines if the DTMF signal that was scanned in step 182 includes the DTMF tones for a "*" switch or key. In a preferred embodiment of the present invention, each sequence of DTMF keys that are activated by a user to initiate a controlled function on a remote device begins with the * key being activated on the keypad of a telephone. If the command DTMF tones include the signal associated with the * switch or key, the logic continues with a step 186. Otherwise, the logic simply loops back to wait for the scan of the DTMF signal to detect a sequence of DTMF tones that starts with the * DTMF signal.

In step 186, the processor or microcontroller parses the signal represented by the predefined DTMF tones to determine the appropriate controlled function to be implemented. As noted above, any of a plurality of different controlled functions can be initiated by a user activating the corresponding predefined sequence of switches on a keypad of a telephone. Thus, step 186 determines the specific DTMF tones produced by the user activating a sequence of switches on the keypad, beginning with the * switch. It is contemplated that other predefined sequences of switches that do not include the * switch can alternatively be used for controlling other equipment. Based upon the results of step 186, the processor or microcontroller sends a valid command to the IR or RF transmitter in a step 188. The valid command causes the IR or RF transmitter to transmit an IR or RF signal to the device that is being controlled to affect a predefined controlled function on that device corresponding to the switches on the keypad that were activated by the user. The logic then loops back to step 182 to await the scan of a further DTMF signal.

Figures 7, 8:
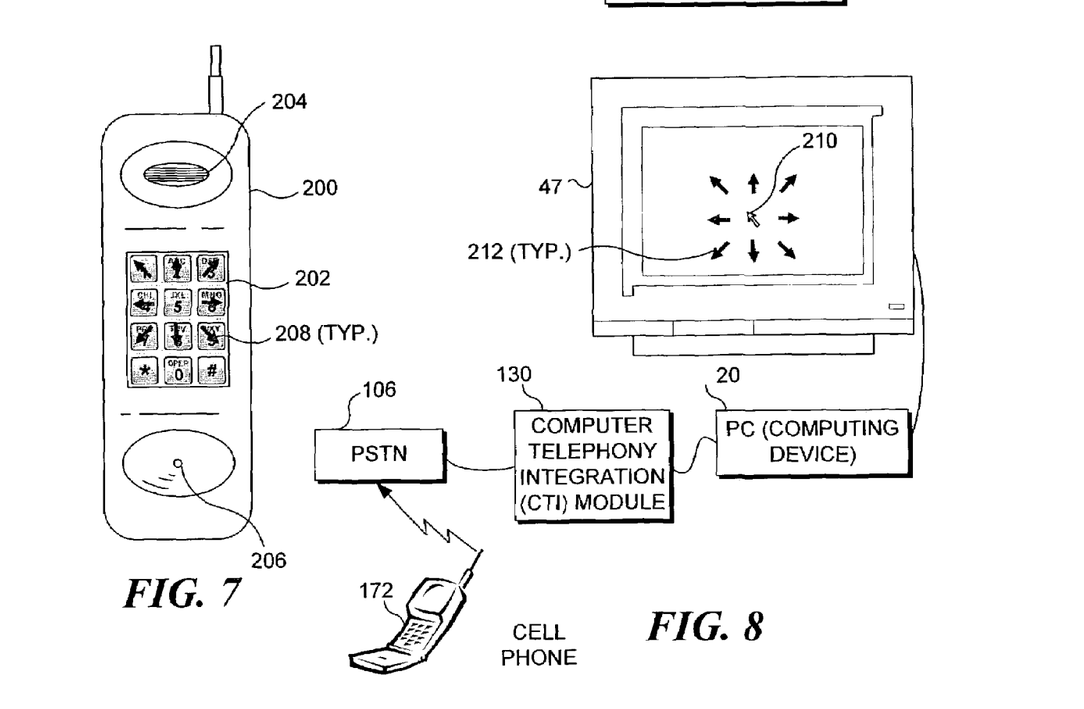
FIG. 7 is a portable (wireless) handset having a keypad that can be used for controlling a cursor on a display or in a presentation, in accord with another embodiment of the present invention.
FIG. 8 is schematic block diagram illustrating the use of a cell telephone for controlling a cursor on a computer device monitor or display.

In addition to controlling A/V equipment or other types of equipment, so that a controlled function is carried out by the equipment in response to receiving the wireless control signal transmitted by the present invention, other remote control functions can also be implemented. For example, FIG. 7 illustrates a portable handset 200 of a telephone that is otherwise generally conventional. Handset 200 includes a keypad 202, a speaker 204, and a microphone 206. The DTMF tones produced by a user activating the switches on the keypad are monitored by the present invention, as explained above. However, instead of causing a controlled function to be implemented on equipment, in this embodiment, the present invention is used for controlling the direction in which a cursor is moved on a display and for emulating other functions of a pointing device, such as a mouse. Arrows 208 show the eight different directions in which a cursor can be moved by a user activating a switch on the keypad associated with a specific direction (indicated by the corresponding arrow 208) in which the cursor is to be moved. In essence, keypad 202 has much the same functionality of the mouse keys provided by the numeric keypad portion of a keyboard used with a conventional PC, such as PC 20. In addition to the directional control of the cursor, the * switch can be activated to provide the function of a left mouse button and the # sign switch can be activated to provide the function of the right mouse button. Also, the 0 switch can be activated to provide the function of toggling the latching of a mouse button.

In FIG. 8, the keypad of a cell telephone 172 is employed in connection with the present invention for controlling the direction in which a cursor 210 moves on monitor 47. The DTMF signal produced by activating selected switches on the keypad of cell telephone 172 is transmitted to PSTN system 106, which is coupled to CTI module 130. The CTI module is connected to PC 20 (or to another type of computing device), which responds to the DTMF tones produced by the user activating the switches on keypad 172, by moving cursor 210 in any of the desired directions 212. In addition, the other switches on the keypad of cell telephone 172 can be used to implement the functionality of the left and right buttons on a conventional mouse and for toggling latching of a button, as noted above.

Alternatively, the switches on the keypad of cell telephone 172, or other POTS telephone or handset can be used for controlling a cursor in a presentation executed with PC 20. Instead of providing the presentation on monitor 47, the presentation can be projected on a much larger display, visible to an audience in a room where the presentation is being given. A user can then activate selected switches on the keypad of the telephone to control the location and movement of the cursor on the display, or to make selections in a graphic user interface.

Although the present invention has been described in connection with the preferred form of practicing it, those of ordinary skill in the art will understand that many modifications can be made thereto within the scope of the claims that follow. Accordingly, it is not intended that the scope of the The invention in which an exclusive right is claimed is defined by the following:

1. A system for using a telephone signal to control transmission of a wireless remote control signal for controlling a device, comprising:

(a) a telephone having a keypad comprising a plurality of switches that are selectively activatable;

(b) a signal monitoring circuit that is responsive to characteristics of a signal associated with the telephone, said signal monitoring circuit transmitting a predefined control signal in response to detecting a predefined state of the signal, after the signal monitoring circuit has learned the predefined control signal; said predefined control signal having a characteristic that effects a controlled function on a device that is controlled thereby;

(c) a learning module configured to learn the predefined control signal from a first remote control associated with the device; wherein the signal monitoring circuit does not comprise the first remote control;

(d) a memory in which characteristics for a plurality of predefined control signals, including at least one predefined control signals for adjusting a volume setting, are stored for use in controlling a device, said signal monitoring circuit being coupled in communication with the memory for accessing the characteristics of the plurality of predefined control signals and transmitting a specific one of the plurality of predefined control signals retrieved from the memory, where the specific one of the plurality of predefined control signals is selected in response to a detected state of the signal associated with the telephone; and (e) an audibility suppressing module configured to suppress the audibility of a DTMF signal by another party who is coupled in communication with a user activating any of the plurality of switches to produce the DTMF signal.

2. The system of claim 1, further comprising a means for conveying the signal associated with the telephone to a different location over one of a private branch exchange and a public switched telephone network, and wherein the transmitting the control signal is carried out at the different location.

3. The system of claim 1, further comprising an infrared light source coupled to the signal monitoring circuit, said infrared light source producing an infrared light that comprises the control signal.

4. The system of claim 1, further comprising a radio frequency transmitter coupled to the signal monitoring circuit, said radio frequency transmitter producing a radio frequency signal that comprises the control signal.

5. The system of claim 1, wherein the signal associated with the telephone comprises an off-hook signal that is produced when the telephone is taken off hook.

6. The system of claim 1, wherein the signal associated with the telephone comprises a ringing signal that is produced to indicate that a call is incoming to the telephone.

* * * * *